Sept. 22, 1959     H. E. HANSEN     2,905,308

MOVING STAIRWAY

Filed June 15, 1956

WITNESSES
Robert C. Baird
Wm. B. Sellers.

INVENTOR
Hans E. Hansen.
BY C. L. Freedman
ATTORNEY

United States Patent Office 2,905,308
Patented Sept. 22, 1959

2,905,308

MOVING STAIRWAY

Hans E. Hansen, Staten Island, N.Y., assignor to Westinghouse Electric Corporation, East Pittsburgh, Pa., a corporation of Pennsylvania Application June 15, 1956, Serial No. 591,751

11 Claims. (Cl. 198—16)

This invention relates to moving stairways and it has particular relation to wheels for the steps of moving stairways.

In a conventional moving stairway a continuous flexible unit is provided which may take the form of a pair of continuous chains together with steps spaced around the continuous chains. Each of the steps is supported by rollers or wheels which are guided in a closed path by suitable guide means such as tracks. The wheels desirably are constructed to provide cushions between the steps and the tracks for the purpose of minimizing transmission of vibration and noise therebetween. For example, each of the wheels may be provided with a rim or tire constructed of a suitable elastomer.

In order to provide optimum cushioning, an elastomer rim or tire for a step wheel should be relatively soft. However, excessive deflection or deformation of the tire under load results in rapid wear of the tire and possibly in improper alignment of parts.

The load to which a step wheel is subjected varies appreciably during movement of the wheel along its tracks. In practice, the tracks include several distinct portions. A first portion is straight but inclined relative to the horizontal by an angle which is conventionally of the order of 30°. A second portion is substantially horizontal and forms a step platform at one of the ends of the stairway. A third portion connects the first and second portions by a relatively short arcuate path to assure a smooth and gradual transition of the step wheels between the first and second portions.

It has been found that the loading of the step wheels connected to the step chains is greatest as they pass over the third portion of the tracks. Consequently, a step wheel that provides optimum cushioning for the straight portion of the tracks may deflect and wear excessively as it passes over the third portion of the tracks.

In accordance with the invention, a wheel device is employed for supporting a stairway step which includes first and second wheels. The first wheel is designed to deflect under load for the purpose of providing a cushion between the associated step and the tracks of the stairway. The second wheel is mounted adjacent the first wheel. The second wheel may be constructed to be less deflectable under load than the first wheel.

The first wheel engages the tracks throughout the effective lengths of the tracks. However, the second wheel preferably engages the tracks only when called on to limit deflection of the first wheel. Such operation is provided by making the second wheel smaller in diameter than the first wheel.

With this custruction the steps are substantially cushioned from the tracks by the first wheels. This is true even when the stairway is substantially loaded and preferably is true up to the rated capacity load of the stairway. However, as each of the wheel devices passes over the third portion of the tracks the second wheel of such device briefly engages the third portion to limit deflection of the first wheel. With such a construction the first wheels may be constructed to provide optimum cushioning for the steps without being subjected to excessive wear or deflection.

In each of the wheel devices the wheels may be designed to rotate as a unit. Preferably, however, each of the first wheels is independently rotatable about its axis with respect to its associated second wheel.

It is, therefore, an object of the invention to provide an improved moving stairway.

It is a further object of the invention to provide an improved moving stairway having steps supported by wheel devices wherein each of the wheel devices includes two portions having different deflection characteristics.

It is another object of the invention to provide an improved stairway having steps supported by wheel devices wherein each of the wheel devices includes a pair of wheels of different diameters, the larger of the wheels being deflectable under load.

It is also an object of the invention to provide a stairway as set forth in the preceding paragraph wherein the wheels are independently rotatable about a common axis.

It is an additional object of the invention to provide an improved wheel device for moving stairways which includes a pair of adjacent wheels having different deflection characteristics.

It is a still further object of the invention to provide a wheel device for supporting the steps of moving stairways which includes a pair of wheels of different diameters mounted adjacent each other for independent rotation about a common axis.

Other objects of the invention will be apparent from the following description taken in conjunction with the accompanying drawing, in which.

The illustration of Fig. 1 is similar to the illustration shown in Fig. 1 of my Patent 2,649,181, which issued August 18, 1953 and similar reference characters are employed for depicting similar parts. For completeness, the stairway of Fig. 1 is briefly described.

Figure 1:
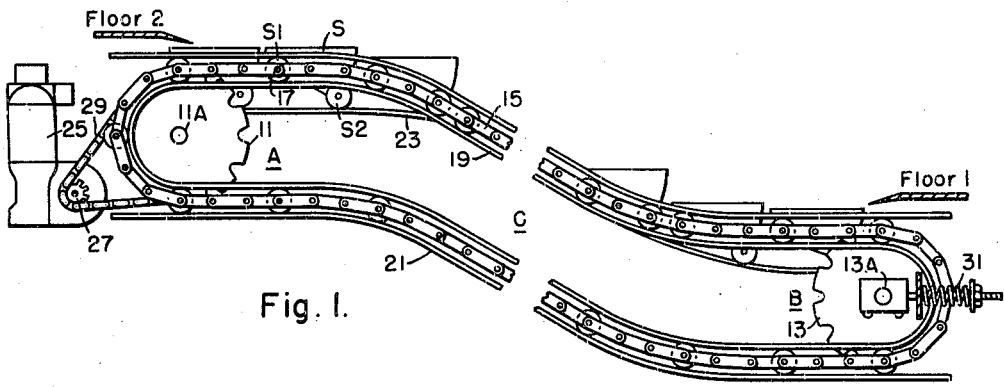
Figure 1 is a view in side elevation with parts broken away of a moving stairway which may embody the invention.
Figure 3:
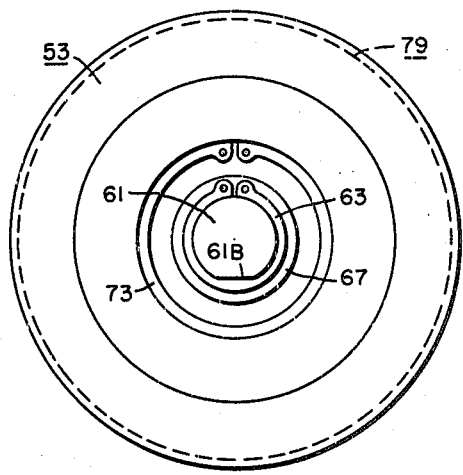
Fig. 3 is a view in side plan of the wheel device of Fig. 2. The track of Fig. 2 is not reproduced in Fig. 3.

Fig. 1 shows a moving stairway for conveying passengers between two levels which are represented as floors 1 and 2 of a building. The moving stairway comprises an upper track assembly A, a lower track assembly B and a straight track assembly or portion C. As previously pointed out, the straight portion usually is inclined at an angle relative to the horizontal of the order of 30°. Each track assembly includes track parts and parts of a supporting structure or truss which is not illustrated in Fig. 1.

The moving stairway of Fig. 1 includes a pair of spaced wheels 11 and 13 which are mounted for rotation about parallel spaced axes. These wheels are employed for guiding an endless flexible unit 15 in a continuous path. In customary practice the wheels 11 and 13 are sprocket wheels for guiding a flexible unit 15 in the form of an endless chain in a predetermined path.

The chain 15 has secured thereto a plurality of steps S. Each of the steps has a shaft 17 which passes through the chain 15 for movement therewith. Each shaft 17 carries a roller of wheel S1 which is mounted for rotation with respect to the associated shaft and which is guided in a predetermined path by means of tracks 19 and 21. As one of the shafts 17 reaches one of the sprocket wheels 11 or 13, it is received within the valley between successive sprocket teeth for movement about the axis of such sprocket wheel. Consequently, the sprocket wheels serve to transfer the steps between the tracks 19 and 21. Each step also includes a roller or wheel S2 which cooperates with additional tracks represented by the track 23 in Fig. 1 for further guiding the steps. The rollers or wheels S1 and S2 of a step are spaced in the direction of travel of the associated step.

Although a single flexible unit or chain may be employed, in practice the shafts 11A and 13A which support the sprocket wheels 11 and 13 are each provided with an additional sprocket wheel. The sprocket wheels on each shaft are spaced axially therealong. The additional sprocket wheels would have a chain similar to the chain 15 and this chain would be associated similarly with the steps S. Also, in common practice, each step S has a pair of similar rollers at each end which cooperate in substantially the same manner with associated tracks. However, for the purpose of the present discussion it suffices to consider the parts associated with the single chain 15.

A conventional electric motor 25 is provided for rotating the shaft 11A in any suitable manner. For example, the motor 25 may be connected through reduction gearing to a sprocket wheel 27 which is coupled to a sprocket wheel (not shown) secured to the shaft 11A through a chain 29. Suitable motor control circuits for moving stairways are well known in the art. It may be pointed out further that the construction of the steps S and their association with chains may be in accordance with the teachings of the Dunlop Patent 2,085,076.

The loading of the wheels S1 does not remain uniform as these wheels travel over their associated tracks. This may be shown by a consideration of three portions of the tracks. The first portion is the inclined straight portion of the tracks represented by the track assembly C. It will be recalled that this portion is inclined relative to the horizontal by an angle of the order of 30°. The second portion is the horizontal portion of the tracks presented by the upper track assembly A. The third portion to be considered is the portion connecting the first and second portions. The third portion of the tracks is curved to provide a smooth transition of the wheels between the first and second portions of the tracks.

It will be assumed that the moving stairway is operating to carry passengers from the first floor to the second floor. Under such circumstances the sprocket wheels 11 and 13 rotate in a counterclockwise direction as viewed in Fig. 1.

During a major part of its travel over the first and second portions of the tracks, a wheel S1 is subjected to a loading consisting substantially only of the weight of the associated step and the weight of any passenger or passengers on such step. However, when the wheel is at or adjacent the third portion of the tracks, that is the curved portion, a substantial additional load is applied to the wheel from the chain 15. The increase in loading of the wheels S1 may be visualized by assuming that the chains are pulling a heavy load of passengers "uphill." A component of the force exerted by the chains is exerted against the wheels S1 as they roll around the curved portion of the tracks or "over the hump." Consequently, the wheel must be designed to carry the maximum loading which is present during a small portion only of its travel. This maximum loading depends on the rise of the stairway and the radius of curvature of the curved portion. For a given radius and a given wheel, the rise or length of the stairway is limited by the wheel load capacity. It should be noted that an increase in the radius of curvature to reduce the maximum loading may be accompanied by an undesirable increase in stairway dimensions.

Figure 2:
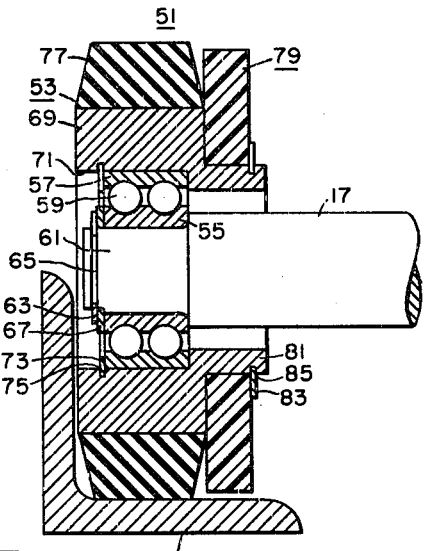
Fig. 2 is a view in section of a wheel device suitable for the stairway of Fig. 1 in association with a track.

Referring to Fig. 2, a wheel device 51 is illustrated which may be employed as the wheel S1 of Fig. 1. The wheel device 51 includes a first wheel 53 which is mounted for rotation with respect to the shaft 17 by any suitable bearing such as a sleeve bearing or an antifriction bearing of the ball or roller type. For illustrative purposes, it will be assumed that the bearing is a ball bearing having an inner race 55, an outer race 57 and two rows of balls 59 positioned between the two races.

The shaft 17 has an end 61 of reduced diameter which is received within the inner race 55. If desired these parts may be held together by means of a press fit therebetween. However, it will be assumed that a split spring lock ring 63 is partially received within an annular groove 65 in a conventional manner for the purpose of securely locking the inner race in the illustrated position. A spacing washer 67 is located between the lock ring and the inner race. This washer may be prevented from rotating by forming a flat portion 61B on the shaft end 61 and by providing the washer with a complementary flat portion.

The first wheel 53 has a cylindrical body or hub 69 constructed of a suitable rigid material such as steel or cast iron. This body 69 has a central bore 71 proportioned to receive the outer race 57. The body 69 and the race 57 may be secured to each other by a suitable press fit. However, in the embodiment of Fig. 2 a conventional spring split lock ring 73 is partially received in an annular groove 75 of the body 69 to lock securely the outer race in its illustrated position.

The first wheel 53 is provided with a rim or tire 77 constructed of a suitable resilient cushioning material. In a preferred embodiment of the invention this material takes the form of an elastomer such as natural rubber or a resilient synthetic or artificial rubber which may be suitably secured to the body 69 as by vulcanization or cement. It will be noted that the tire 77 engages the track 19 which is illustrated as a steel angle.

The components of Fig. 2 thus far referred to specifically represent a construction which is well known in the art. However, if the tire 77 is constructed to provide optimum cushioning for the inclined first portion of the tracks or the horizontal second portion of the tracks, it will be found that the tire is abnormally deformed and wears excessively as it traverses the curved third portion of the tracks, particularly on high rise stairways. In order to eliminate this excessive deflection and wear, a second wheel 79 is provided which is adjacent to the first wheel 53. The wheel 79 may be constructed of any suitable material capable of carrying the desired loading such as steel or cast iron, or it may be constructed of a suitable resin such as a phenolic resin. As an example, the body 69 and the wheel 79 both may be cast or machined from a unitary block of cast iron or steel. However, in the preferred embodiment of the invention, the wheel 79 is independent of the body 69.

As shown in Fig. 2, the body 69 has a tubular projection 81 concentric with the shaft 17 and the wheel 79 has a central bore proportioned to receive the projection 81. Although the wheel 79 and the projection 81 may have a press fit sufficient to insure rotation of the body 69 and the wheel 79 as a unit, preferably the wheel 79 is mounted for rotation independently of the body 69. The wheel 79 may be held in position by means of a conventional split lock ring 83 which is partially received within an annular groove 85 in the projection 81.

As clearly shown in Fig. 2, the wheel 79 has a diameter which is smaller than the diameter of the tire 77. The material of the tire 77 and its dimensions are selected to carry at least a substantial part of the loading represented by the associated step or any passenger or passengers on the step while on the first or second portions of the tracks without permitting engagement of the wheel 79 with the track 19. In a preferred embodiment of the loading, the first wheel 53 is capable of carrying the rated loading of the associated step under these conditions without permitting engagement of the wheel 79 with the associated track 19.

When the wheel device 51 is at or adjacent the curved third portion of the track the additional radial loading of the wheel imparted by the chain 15 forces the second wheel 79 into engagement with the track 19. Consequently, the wheel 79 serves to limit deflection of the first wheel 53.

To illustrate suitable parameters, the wheel 53 may be permitted to deflect for a distance of the order of 1/64 to 1/8 of an inch. That is, the outer radius of the wheel 53 may be 1/64 to 1/8 of an inch larger than that of the wheel 79.

With this construction the first wheel 53 may be designed to provide optimum cushioning during a major portion of the travel of the wheel device over its associated tracks. If such a wheel 53 were called on to support the entire loading as it passed over the curved third portion of the tracks, it would be deformed excessively with resultant excessive wear, particularly for high rise stairways. However, because of the presence of the second wheel 79, such excessive deformation and wear is prevented.

Because of the resilience of the tire, the load is transferred gradually and smoothly to the wheel 79 as the wheel enters the curved third portion of the tracks. The smoothness of the transfer is further enhanced by the gradual curvature of the tracks as shown on the drawing.

Figure 4:
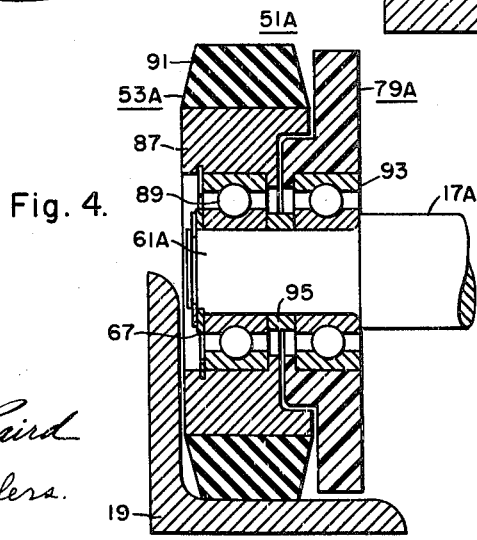
Fig. 4 is a view in section of a wheel device suitable for the stairway of Fig. 1 and associated with a track to illustrate a modified form of the invention.

Referring now to the modification of Fig. 4, it will be noted that a wheel device 51A is provided which includes a first wheel 53A and a second wheel 79A. These wheels correspond respectively to the wheels 53 and 79 of Fig. 2.

The wheel 53A includes a body 87 constructed of a suitable material such as steel or cast iron. This body is mounted for rotation with respect to the shaft 17A by means of a suitable ball bearing 89 having an inner race engaging an end 61A of the shaft 17A which is of reduced diameter, and having an outer race engaging the body 87. The bearing may be secured to the associated parts in the same manner by which the bearing of Fig. 2 is secured to the corresponding parts. The wheel 53A has a rim or tire 91 which corresponds to the rim or tire 77 of Fig. 2 and which is constructed in the same manner.

The wheel 79A is constructed of a suitable material such as steel, cast iron or a resin such as a phenolic resin. It is mounted for independent rotation with respect to the shaft 17A by means of a separate ball bearing 93 having an inner race mounted on the end 61A of the shaft and an outer race received within a central bore of the wheel 79A. The outer race may be securely held within the bore by means of a suitable press fit. A spacing collar 95 surrounds the end 61A of the shaft and is located between the inner races of the two bearings. Inasmuch as the wheel 79A has a diameter smaller than the diameter of the first wheel 53A it follows that the two wheels cooperate to carry the loading of the shaft 17A in the same way that the wheels 53 and 79 carry the loading of the shaft 17 in Fig. 2.

Although the invention has been described with certain specific embodiments thereof, numerous modifications falling within the spirit and scope of the invention are possible.

I claim as my invention:

1. In a moving stairway an endless flexible unit, for carrying load, and guide means guiding the unit for movement along a substantially fixed path, said guide means comprising a track assembly having a first portion inclined relative to the horizontal, a second portion substantially horizontal and a third portion connecting the first and second portions, a plurality of wheel devices spaced along the flexible unit for engaging the track assembly to guide and support the flexible unit therealong, each of said wheel devices being mounted for independent rotation relative to the flexible unit about an axis transverse to said path, each of the wheel devices comprising a first wheel mounted for rotation about said axis relative to the axis and a second wheel mounted adjacent said first wheel for rotation about the axis, said wheels having different load-responsive deflection characteristics, the first wheel having a diameter larger than the diameter of the second wheel, the three portions of the track assembly being positioned successively to engage and support the rim of the first wheel as the unit moves along said fixed path, the second wheel engaging the track assembly to provide additional support for the flexible unit as the force urging the flexible unit toward the track assembly increases to a predetermined magnitude as the unit moves along said fixed path.

2. In a moving stairway an endless flexible unit, and guide means guiding for movement along a substantially fixed path, said guide means comprising a track assembly having a first portion inclined relative to the horizontal, a second portion substantially horizontal and a third portion connecting the first and second portions, a plurality of wheel devices spaced along the flexible unit for engaging the track assembly to guide the flexible unit therealong, each of said wheel devices being mounted for independent rotation relative to the flexible unit about an axis transverse to said path, each of the wheel devices comprising a first wheel mounted for rotation about said axis relative to the axis and a second wheel mounted adjacent said first wheel for rotation about the axis, said first wheel having a diameter larger than said second wheel to space the rim of the second wheel from the track assembly, said first wheel having a deflection under its maximum rated loading sufficient to bring the second wheel into engagement with the track assembly substantially while the first wheel is traversing the third portion of the track assembly, but not while the first wheel is traversing the first portion of the track assembly, the points of engagement of said third portion with said first and second wheels being equidistant from said axis.

3. In a moving stairway an endless flexible unit for carrying load, and guide means guiding the unit for movement along a substantially fixed path, said guide means comprising a track assembly having a first portion inclined relative to the horizontal, a second portion substantially horizontal and a third portion connecting the first and second portions, a plurality of wheel devices spaced along the flexible unit for engaging the track assembly to guide and support the flexible unit therealong, each of said wheel devices being mounted for independent rotation relative to the flexible unit about an axis transverse to said path, each of the wheel devices comprising a first wheel mounted for rotation about said axis relative to the axis and a second wheel mounted adjacent said first wheel for rotation about the axis, said wheels having different load-responsive deflection characteristics, the first wheel having a radius larger than the radius of the second wheel, the difference between said radii not exceeding approximately one-eighth inch, the three portions of the track assembly being positioned successively to engage and support the rim of the first wheel as the unit moves along said fixed path, said first wheel being rotatable relative to its associated second wheel about the common axis of such wheels, the second wheel engaging the track assembly to provide additional support for the flexible unit as the force urging the flexible unit toward the track assembly increases to a predetermined magnitude as the unit moves along said fixed path.

4. In a moving stairway an endless flexible unit, and guide means guiding the unit for movement along a substantially fixed path, said guide means comprising a track assembly having a first portion inclined relative to the horizontal, a second portion substantially horizontal and a third portion connecting the first and second portions, a plurality of wheel devices spaced along the flexible unit for engaging the track assembly to guide the flexible unit therealong, each of said wheel devices being mounted for independent rotation relative to the flexible unit about an axis transverse to said path, each of the wheel devices comprising a first wheel mounted for rotation about said axis relative to the axis and a second wheel mounted adjacent said first wheel for rotation about the axis, said wheels having different load-responsive deflection characteristics, said first wheel including a resilient elastomer tire of solid construction having a deflection under load greater than the deflection of the second wheel for such load, the first wheel having a radius larger than the radius of the second wheel, the difference between said radii not exceeding approximately one-eighth inch, the three portions of the track assembly being positioned successively to engage and support the rim of the first wheel as the unit moves along said fixed path.

5. In a moving stairway an endless flexible unit, and guide means guiding the unit for movement along a substantially fixed path, said guide means comprising a track assembly having a first portion inclined relative to the horizontal, a second portion substantially horizontal and a third portion connecting the first and second portions, a plurality of wheel devices spaced along the flexible unit for engaging the track assembly to guide the flexible unit therealong, each of said wheel devices being mounted for independent rotation relative to the flexible unit about an axis transverse to said path, each of the wheel devices comprising a first wheel mounted for rotation about said axis relative to the axis and a second wheel mounted adjacent said first wheel for rotation about the axis, said wheels having different load-responsive deflection characteristics, the first wheel having a diameter larger than the diameter of the second wheel, the three portions of the track assembly being positioned successively to engage and support the rim of the first wheel as the unit moves along said fixed path, the first wheel being rotatable relative to its associated second wheel about the common axis of such wheels, and said first wheel having a deflection under load greater than the deflection of the second wheel for such load.

6. In a moving stairway an endless flexible unit, and guide means guiding the unit for movement along a substantially fixed path, said guide means comprising a track assembly having a first portion inclined relative to the horizontal, a second portion substantially horizontal and a third portion connecting the first and second portions, a plurality of wheel devices spaced along the flexible unit for engaging the track assembly to guide the flexible unit therealong, each of said wheel devices being mounted for independent rotation relative to the flexible unit about an axis transverse to said path, each of the wheel devices comprising a first wheel mounted for rotation about said axis relative to the axis and a second wheel mounted adjacent said first wheel for rotation about the axis, said first wheel having a diameter larger than said second wheel to space the rim of the second wheel from the track assembly, said first wheel having a deflection under its maximum rated loading sufficient to bring the second wheel into engagement with the track assembly substantially while the first wheel is traversing the third portion of the track assembly, but not while the first wheel is traversing the first portion of the track assembly, the points of engagement of said third portion with said first and second wheels being equidistant from said axis, said first wheel having an elastomer rim portion which is yieldable under load, and said second wheel having a rim portion which is less yieldable than said elastomer under load.

7. In a moving stairway an endless flexible unit, and guide means guiding the unit for movement along a substantially fixed path, said guide means comprising a track assembly having a first portion inclined relative to the horizontal, a second portion substantially horizontal and a third portion connecting the first and second portions, a plurality of wheel devices spaced along the flexible unit for engaging the track assembly to guide the flexible unit therealong, each of said wheel devices being mounted for independent rotation relative to the flexible unit about an axis transverse to said path, each of the wheel devices comprising a first wheel mounted for rotation about said axis relative to the axis and a second wheel mounted adjacent said first wheel for rotation about the axis, said first wheel having a diameter larger than said second wheel to space the rim of the second wheel from the track assembly, said first wheel having a deflection under its maximum rated loading sufficient to bring the second wheel into engagement with the track assembly substantially while the first wheel is traversing the third portion of the track assembly, but not while the first wheel is traversing the first portion, and said first wheel being rotatable relative to the second wheel about the common axis of said wheels.

8. In a moving stairway an endless flexible unit, and guide means guiding the unit for movement along a substantially fixed path, said guide means comprising a track assembly having a first portion inclined relative to the horizontal, a second portion substantially horizontal and a third portion connecting the first and second portions, a plurality of wheel devices spaced along the flexible unit for engaging the track assembly to guide the flexible unit therealong, each of said wheel devices being mounted for independent rotation relative to the flexible unit about an axis transverse to said path, each of the wheel devices comprising a first wheel mounted for rotation about said axis relative to the axis and a second wheel mounted adjacent said first wheel for rotation about the axis, said first wheel having a diameter larger than said second wheel to space the rim of the second wheel from the track assembly, said first wheel including a resilient elastomer tire of solid construction having a deflection under its maximum rated loading sufficient to bring the second wheel into engagement with the track assembly substantially while the first wheel is traversing the third portion of the track assembly, but not while the first wheel is traversing the first portion of the track assembly, the points of engagement of said third portion with said first and second wheels being equidistant from said axis, said first wheel having an elastomer rim portion which is yieldable under load, said second wheel having a rim portion which is less yieldable than said elastomer under load, the first wheel being rotatable relative to the second wheel about the common axis of such wheels.

9. In a moving stairway an endless flexible unit for carrying load, and guide means guiding the unit for movement along a substantially fixed path, said guide means comprising a track assembly having a first portion inclined relative to the horizontal, a second portion substantially horizontal and a third portion connecting the first and second portions, a plurality of wheel devices spaced along the flexible unit for engaging the track assembly to guide and support the flexible unit therealong, each of said wheel devices being mounted for independent rotation relative to the flexible unit about an axis transverse to said path, each of the wheel devices comprising a first wheel mounted for rotation about said axis relative to the axis and a second wheel mounted adjacent said first wheel for rotation about the axis, said wheels having different load-responsive deflection characteristics radial to the axis, the material of the first wheel being displaced in an axial direction when subjected to load, the first wheel having a diameter larger than the diameter of the second wheel, the rim of the first wheel being spaced from the second wheel and from the track assembly sufficiently to permit said displacement without interference from the second wheel or from said track assembly, the three portions of the track assembly being positioned successively to engage and support the rim of the first wheel as the unit moves along said fixed path, the second wheel engaging the track assembly to provide additional support for the flexible unit as the force urging the flexible unit toward the track assembly increases to a predetermined magnitude as the unit moves along said fixed path.

10. In a moving stairway an endless flexible unit for carrying load, and guide means guiding the unit for movement along a substantially fixed path, said guide means comprising a track assembly having a first portion inclined relative to the horizontal, a second portion substantially horizontal and a third portion connecting the first and second portions, a plurality of wheel devices spaced along the flexible unit for engaging the track assembly to guide and support the flexible unit therealong, each of said wheel devices being mounted for independent rotation relative to the flexible unit about an axis transverse to said path, each of the wheel devices comprising a first wheel mounted for rotation about said axis relative to the axis and a second wheel mounted adjacent said first wheel for rotation about the axis, said wheels having different load-responsive deflection characteristics radial to the axis, said first wheel having a deflection under load greater than the deflection of the second wheel for such load, the material of the first wheel being displaced in an axial direction when subjected to load, the first wheel having a diameter larger than the diameter of the second wheel, the rim of the first wheel being spaced from the second wheel and from the track assembly sufficiently to permit said displacement without interference from the second wheel or from said track assembly, the three portions of the track assembly being positioned successively to engage and support the rim of the first wheel as the unit moves along said fixed path, said second wheel engaging the track assembly to furnish additional support for the flexible unit when the load supported by said first wheel attains a predetermined magnitude as the unit moves along said fixed path, the points of engagement of said track assembly with said first and second wheels being equidistant from said axis.

11. A wheel device for supporting the steps of moving stairways, said wheel device comprising a first wheel and a second wheel having a radius smaller than the radius of the first wheel, the difference between said radii not exceeding approximately one-eighth inch, means mounting the wheels adjacent each other for independent rotation relative to said steps and relative to one another about a common axis, said first wheel including a resilient elastomer tire of solid construction having a substantial first deflection when subjected to pressure in a direction radial to the axis, the second wheel having a deflection smaller than the first deflection when subjected to said pressure, said tire being displaced in an axial direction when subjected to said pressure, said tire being spaced from the second wheel sufficiently to permit said displacement without interference from said second wheel.

References Cited in the file of this patent
UNITED STATES PATENTS

| | | |
|---|---|---|
| 2,104,565 | Ludwick | Jan. 4, 1938 |
| 2,649,181 | Hansen | Aug. 18, 1953 |

FOREIGN PATENTS

| | | |
|---|---|---|
| 681,918 | Germany | Oct. 4, 1939 |